United States Patent [19]
Shah et al.

[11] Patent Number: 5,991,790
[45] Date of Patent: Nov. 23, 1999

[54] GENERATION AND DELIVERY OF SIGNALS IN A TWO-LEVEL, MULTITHREADED SYSTEM

[75] Inventors: Devang K. Shah, Foster City; John Zolnowsky, Milpitas, both of Calif.

[73] Assignee: Sun Microsystems, Inc., Sunnyvale, Calif.

[21] Appl. No.: 08/674,323

[22] Filed: Jul. 1, 1996

[51] Int. Cl.⁶ .................................................. G06F 9/00
[52] U.S. Cl. ......................... 709/100; 710/260; 710/266
[58] Field of Search ............................... 395/670, 672, 395/674, 676; 709/100, 102, 103, 104, 106; 710/260, 266

[56] References Cited

U.S. PATENT DOCUMENTS

| | | | |
|---|---|---|---|
| 5,062,040 | 10/1991 | Bishop et al. | 364/200 |
| 5,339,415 | 8/1994 | Strout, II et al. | |
| 5,442,758 | 8/1995 | Slingwine et al. | |
| 5,515,538 | 5/1996 | Kleiman | 395/733 |

OTHER PUBLICATIONS

"Multithreading Implementations and Performance Comparisons—A White Paper," published by SunSoft, copyright 1996 Sun Microsystems, Inc., draft of Mar. 15, 1996, pp. 0–44.

Leffler et al., "Signals," *The Design and Implementation of the 4.3BSD UNIX Operating System*, pp. 94–103.

Stein and Shaw, "Implementing Lightweight Threads," *Summer '92 USENIX Conference*, 1992.

Marrin, "Multithreading support grows among realtime operating systems," *Computer Design*, 32(3): 77–88 (1993).

*Primary Examiner*—Majid A. Banankhah
*Attorney, Agent, or Firm*—Skjerven, Morrill, MacPherson, Franklin & Friel, L.L.P.; Sam G. Campbell, III

[57] ABSTRACT

A system for properly delivering an signals in a computer system. A first module is called which waits for a signal to be generated. Upon a signal being generated, the first module is notified of the signal's generation. The first module then directs the signal to a second module, and causes the signal to be delivered to the second module.

40 Claims, 8 Drawing Sheets

GENERATION AND DELIVERY OF SIGNALS IN A TWO-LEVEL, MULTITHREADED SYSTEM

BACKGROUND OF THE INVENTION

The present invention relates to the implementation of signals in a multithreaded environment and more particularly to the proper delivery of asynchronous signals in a system supporting both user-level and kernel-level threads.

A thread is a sequence of control within a process and has little context information associated with it. Consequently, a thread has minimal storage requirements. Threads may be grouped into two classes, user threads, which are visible only at the user level, and kernel threads, which are visible only at the kernel-level. A hybrid of these classes is the lightweight process (LWP), a kernel-visible entity which is also visible at the user level. Finally, there is the process, which is also visible to both the user and the kernel, and carries with it the full complement of context information. A process is generally capable of standalone execution.

A traditional, single-threaded process follows a single sequence of control during program execution. However, as multiprocessing (MP) architectures have become more prevalent, the use of multiple threads has become an important programming paradigm. A multithreaded (MT) process has several sequences of program control, and is thus capable of taking several independent actions. In an MP system, these actions can occur simultaneously, with each thread running on a separate processor. This parallelism increases the performance of MT applications. However, MT also provides performance benefits on uniprocessor systems by improving the overlap of operations such as computation and input/output transactions. MT also offers several other benefits, such as more uniform computational loads, higher throughput, reduced overhead and simplified program structure.

While there are numerous ways to implement MT, the techniques fall primarily into three general categories. These categories are based on the number of user-level threads associated with a given number of kernel-level threads: 1) Many-to-one; 2) One-to-one; and 3) Many-to-many.

Implementations of the many-to-one model allow an application to create a large number of threads that can execute concurrently. This model is also referred to as a "user-level threads" model. In a many-to-one implementation, all threads' activity is restricted to the user-space and is supported entirely by a user threads library, which takes care of all thread management issues. The user threads library limits a process to executing only one thread at any given time, although there is a choice as to which thread is executed. As a result, this model provides only limited parallelism and does not fully exploit the advantages offered by MP architectures.

In the one-to-one model, each user-level thread has access to the kernel. A primary constraint here is that the developer must use caution due to the threads' kernel visibility. Another constraint is that the developer must be frugal in the use of these threads, due to the storage requirements of such threads. As a consequence, many implementations of the one-to-one model limit the number of threads which may be created. This type of thread is similar to the LWP mentioned above.

The many-to-many model avoids several of these limitations. This model, also referred to as the "two-level" model, minimizes programming effort. The computational "cost" and "weight" of each thread are also reduced. The many-to-many model can support as many threads as the many-to-one model, while providing kernel access similar to that in the one-to-one model. In addition to supporting LWPs, this model also provides a user-level threads library. The LWPs are visible to both the user and the kernel, as in the one-to-one model. The user threads are only visible to the user, as in the many-to-one model. User threads may then be associated with LWPs upon execution. Thus, the kernel need only manage the currently active LWPs. A many-to-many implementation simplifies programming at the user level, while effectively removing restrictions on the number of threads an application can use.

An example of a two-level MT architecture is the Solarisw™ OS from SunSoft™ (Sun™, Sun Microsystems™, Solaris and SunSoft are trademarks or registered trademarks in the United States and other countries). The Solaris two-level architecture separates the programming interface from the implementation by providing LWPs. The kernel dispatches each LWP separately, so each LWP is capable of performing independent system calls, incurring independent page faults, and running in parallel on multiple processors. LWPs allow the use of threads without the need to consider their interaction with the kernel. At the user level, the threads library includes a scheduler that is separate from the kernel's scheduler. The threads library thus manages multiplexing and scheduling runnable threads onto the LWPs. User threads are supported at the kernel level by the LWPs.

Solaris provides the application programmer with the option of binding a user-level thread to an LWP, or leaving the thread unbound. Binding a user-level thread to an LWP establishes a connection between the two. Thread binding is useful to applications that need to maintain strict control over their own concurrency (i.e., parallel execution), such as those applications requiring real-time response. Unbound user-level threads defer control of their concurrency to the threads library, which automatically grows and shrinks the pool of LWPs to meet the demands of the application's unbound threads. An LWP may also be shared by several user-level threads.

A primary feature of the above implementation is that the user threads are not visible to the kernel, implying that a thread's attributes are also invisible to the kernel. This off-loads the administrative tasks associated with the user threads from the kernel to the user threads library and user process. However, attributes such as a thread's signal mask are also invisible to the kernel. A signal is a mechanism within a kernel for notifying an executable entity of system events. These events may take the form of inter-process communications, system responses to service requests, error conditions and other such occurrences. A mask, in this context, refers to a mechanism by which an executable entity such as a thread can temporarily ignore one or more signals. A signal can usually be masked, and a masked signal may be held by the kernel as pending. This allows a program to have certain signals temporarily held as pending during the execution of critical code sections to prevent interruption by those signals.

The challenge in implementing this scheme lies in eliciting correct (i.e., expected) program behavior in areas such as signal delivery and scheduling, while retaining the performance and resource conservation goals achieved by minimizing kernel involvement. This is particularly important in the area of delivering asynchronous signals.

Some of the problems which may occur in this regard are best explained by example. In the example, a process (P1) has two threads (T1 and T2) and one LWP (L1). T1 is scheduled on L1 and is blocked in a system call (e.g., waiting for the system to service a request). T1 has the signal SIG masked and so will not respond to SIG. T2 is pending on a user-level queue, awaiting notification by a process-local synchronization variable (e.g., a condition variable). T2 does not have signal SIG masked. P1 has a signal handler (e.g., interrupt routine) installed for signal SIG which is responsible for getting T1 out of its blocking system call. P1 is waiting for SIG to be delivered from another process. When SIG is sent to P1, P1 expects T2 to wake up, and run the signal handler, thus activating T1.

The kernel needs to deliver SIG without explicit knowledge of T1's or T2's signal masks, while ensuring that masking semantics, information delivery and signal queuing are correctly maintained. In addition, signal masking should remain an essentially user-level operation, thus retaining the performance advantages previously mentioned.

One possible manifestation of this problem is encountered by systems which cause T1's mask to be inherited by L1 ("pushed down" to L1). Because L1 has SIG masked in this scenario, the signal handler will never be executed and T1 will never be awakened, resulting in a deadlock condition.

Another possible manifestation of this problem is the kernel inadvertently interrupting T1's system call when delivering SIG to L1. Although the global handler would make sure that the signal was re-directed to T2 and that T1 would not actually run the signal handler, the side-effect of interrupting T1 would be unexpected and unavoidable. This scenario violates at least one aspect of the signal model, that being the signal masking semantic. This semantic requires that, if a thread masks a signal and is blocked in a system call, the system call not be interrupted by the masked signal.

Yet another possible manifestation in the above implementation is a pathological scenario where all application LWPs and their associated threads mask a specific signal. However, a thread might be sleeping on the user-level sleep queue with this signal unmasked. The signal may never be delivered to this thread because there is no thread available which will accept the signal. Signal non-delivery thus results.

The effects of actual signal delivery should also be considered. Actual signal delivery should only be performed once. Moreover, the actual delivery of the signal should only be to the thread that has the signal unmasked. Otherwise, the semantics which commonly govern the generation and delivery of signals may be breached.

Accordingly, it is desirable and important to provide for the proper delivery of asynchronous signals in a two-level, multithreaded environment. Furthermore, the delivery of these signals should not cause unexpected side-effects or breach signalling semantics. Finally, dead-lock and non-delivery of signals should be avoided.

SUMMARY OF THE INVENTION

By virtue of the present invention, a system is provided for the proper delivery of signals generated in a two-level, multithreaded programming environment.

In one embodiment, the method of the present invention provides a computer-implemented method for delivering an asynchronous signal to a thread in a two-level multithreaded architecture. First, a lightweight process (LWP) is designated to receive notification of the asynchronous signal upon the signal's generation. This LWP is referred to as an aslwp. The aslwp is then configured to accept any one of several asynchronous signals. Next, the aslwp waits for the generation of one or more asynchronous signals. The aslwp does so by calling a routine that, upon the asynchronous signal's generation, returns a value identifying the signal. The aslwp is then configured to block all signals. The aslwp determines whether at least one of several threads will accept the asynchronous signal. If at least one of these threads will accept the signal, the aslwp selects one of the threads. The aslwp then redirects the signal to the thread selected. If no thread will accept the signal, the aslwp stores the information relating to the signal. This pending signal is processed when it is later unmasked by a thread.

In another embodiment, the method of the present invention provides a computer-implemented method for delivering an asynchronous signal that includes configuring a first module to accept any one of several asynchronous signals, calling a second module that returns a value identifying the asynchronous signal generated, and determining whether at least one of several other modules will accept the asynchronous signal. If at least one of these modules will accept the asynchronous signal, a module is selected from the several modules, the asynchronous signal is redirected to the module selected, and the asynchronous signal is delivered to the module selected. Otherwise, the asynchronous signal is stored.

A further understanding of the nature and advantages of the inventions herein may be realized by reference to the remaining portions of the specification and the attached drawings.

DESCRIPTION OF SPECIFIC EMBODIMENTS

Figure 1:
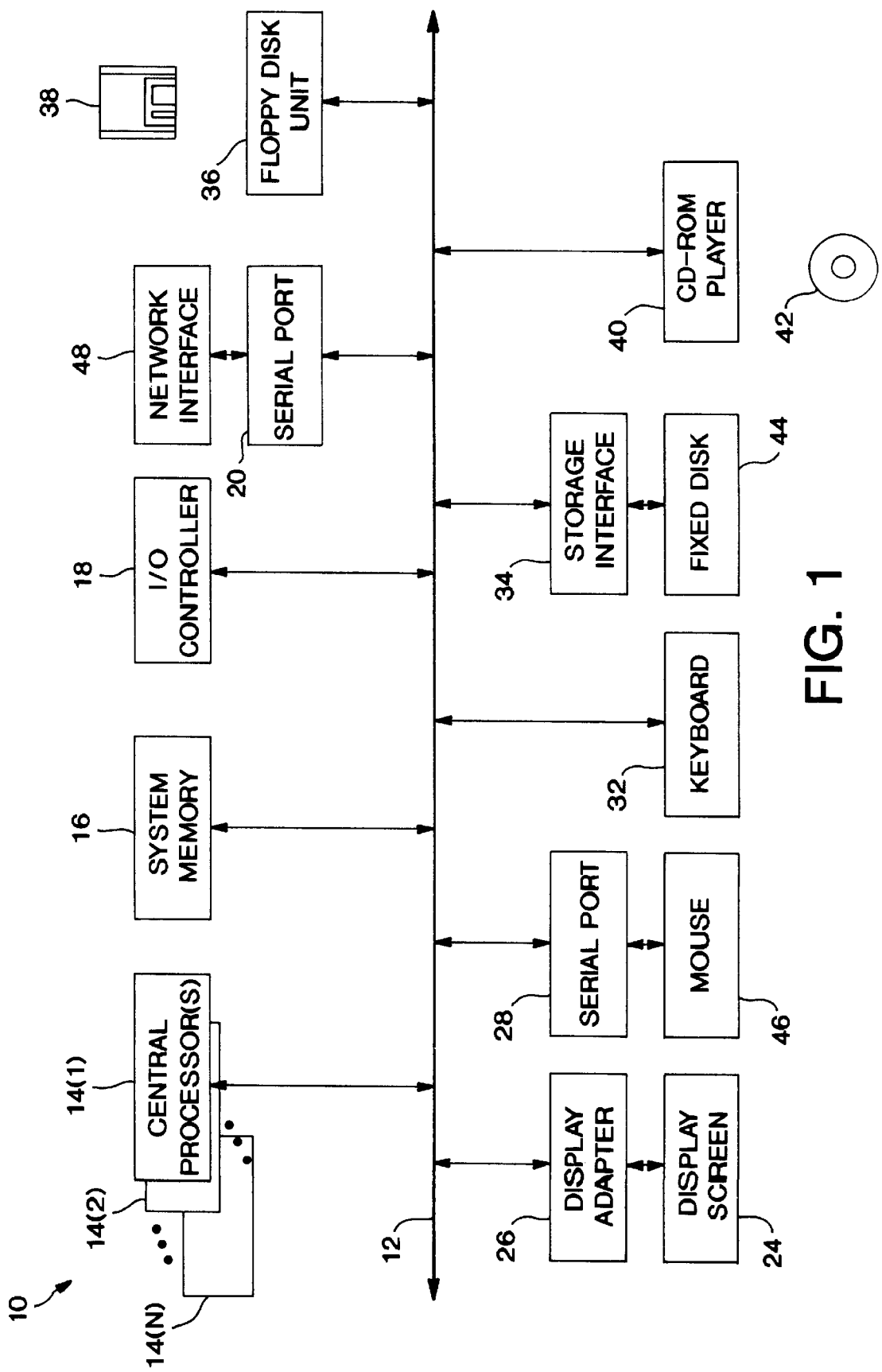
FIG. 1 depicts a block diagram of a host computer system suitable for implementing the present invention.

FIG. 1 depicts a block diagram of a host computer system 10 suitable for implementing the present invention. Host computer system 10 includes a bus 12 which interconnects major subsystems such as one or more central processors 14(1)–14(N), a system memory 16 (typically RAM), an input/output (I/O) controller 18, an external device such as a display screen 24 via display adapter 26, serial ports 28 and 30, a keyboard 32, a storage interface 34, a floppy disk drive 36 operative to receive a floppy disk 38, and a CD-ROM player 40 operative to receive a CD-ROM 42. Host computer system 10 may support a single central processor (e.g., central processor 14 (1)), which is known as a uniprocessor system. Alternatively, host computer system 10 may support multiple central processor (e.g., central processors 14(1)–14(N)). Such a system is known as a multiprocessor system. Storage interface 34 may connect to a fixed disk drive 44. Fixed disk drive 44 may be a part of host computer system 10 or may be separate and accessed through other interface systems. Many other devices can be connected such as a mouse 46 connected via serial port 28 and a network interface 48 connected via serial port 30. Network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1 to be present to practice the present invention, as discussed below. The devices and subsystems may be interconnected in different ways from that shown in FIG. 1. For example, host computer system 10 may be a uniprocessor or multiprocessor system. The operation of a computer system such as that shown in FIG. 1 is readily known in the art and is not discussed in detail in this application. Code to implement the present invention may be operably disposed or stored in computer-readable storage media such as system memory 16, fixed disk 44, CD-ROM 42, or floppy disk 38.

Figure 2:
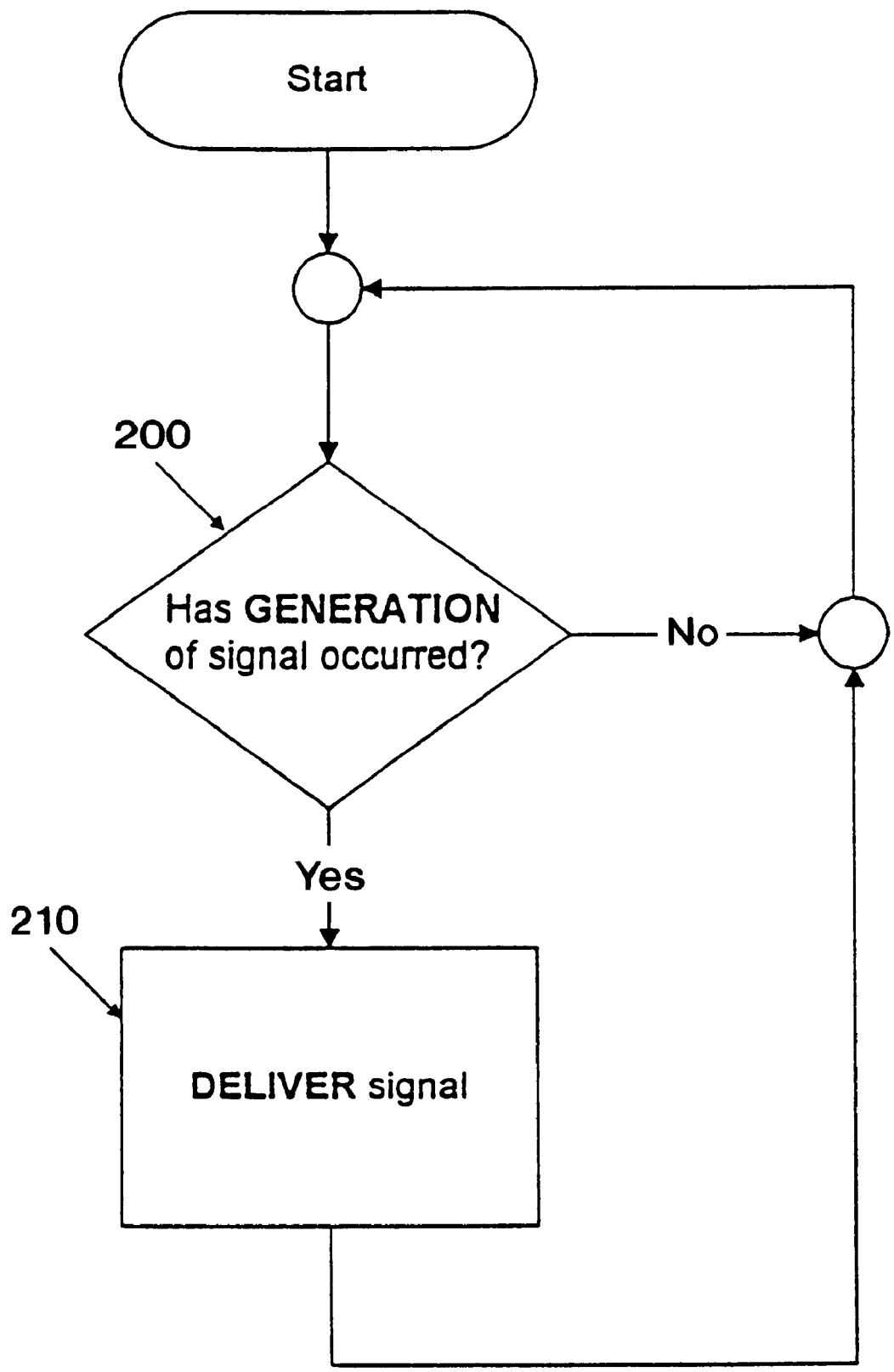
FIG. 2 is a flowchart describing the steps of signal generation and delivery according to the current paradigm.

FIG. 2 shows a flowchart of the current method of handling a signal in computer systems such as the system illustrated in FIG. 1. A signal is a mechanism within a kernel for notifying an executable entity of user actions and system events. Sources generating signals include actions taken by a user (e.g., the user hitting a ctrl-C) and system events (e.g., a general protection fault, floating point error, or hardware interrupt). At step 200, a module waits for an asynchronous signal to be generated. A module is an executable entity, such as a process, thread, lightweight process, user program, kernel program or shell script. Once generated, the signal is delivered to the module at step 210. If the signal cannot be delivered for some reason (e.g., the module is blocked waiting for system resources), the signal is left pending in the signal queue.

For the sake of simplicity, the flowchart of FIG. 2 illustrates only the steps performed in processing a single signal. Normally, an OS is constantly handling several such signals. This constant generation of signals entails the storage of signal information, pending delivery to the proper module, followed by signal delivery at a later time. However, delivery of the various signals to their various intended modules may not occur in the same order as generation. For example, a module may have certain pending signals masked. This and other effects can thus cause signal delivery to occur in an order different from that of generation. The apparent synchronicity portrayed in the flowchart of FIG. 2 is therefore accurate only with regard to the processing performed for each signal when viewed separately. This qualification holds for each of the following descriptions.

However, in multithreaded systems such as that used in the Solaris operating system, problems can occur due to the kernel's inability to access the user threads' signal masks. A mask, in this context, refers to a mechanism by which an executable entity such as a thread can temporarily ignore one or more signals. This requires a solution which guarantees the proper delivery of signals to user threads that might otherwise never receive the signal in question.

Figure 3:
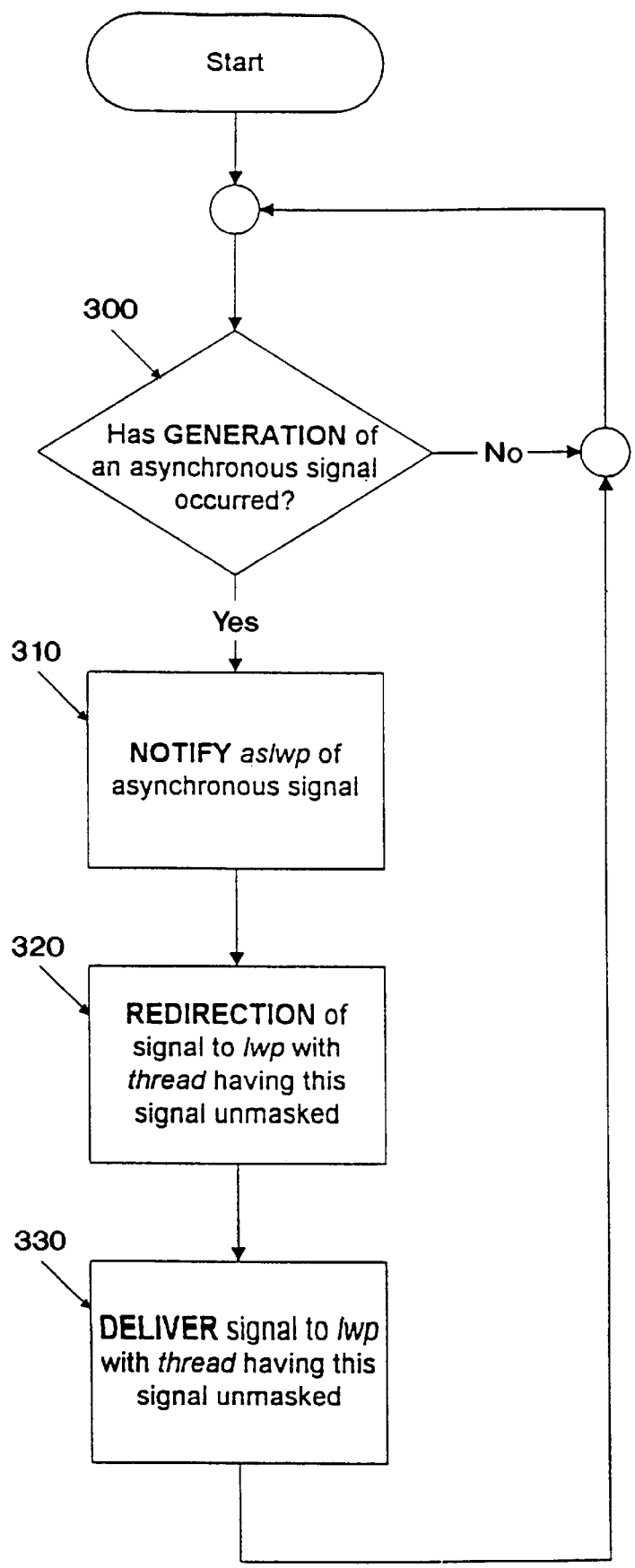
FIG. 3 is a flowchart describing the steps of signal generation and delivery according to one embodiment of the present invention.

FIG. 3 illustrates one embodiment of the method of the present invention. In the method of the present invention, the process of generation and delivery of signals is divided into four steps. The method of the present invention introduces two intermediate stages: signal notification and signal redirection. Signal notification acts as an extension of signal generation by notifying a specified LWP of the signal's generation without actually delivering the signal to the designated module. Signal redirection acts as an extension of signal delivery by indicating to the specified LWP which LWP the signal should be delivered to, prior to actual delivery. This approach increases the kernel's involvement in the delivery of signals, but not to the level of that required by the one-to-one model.

At step 300, the aslwp waits for the generation of a signal. The aslwp (asynchronous lightweight process) is an LWP which is created by the user thread library to receive notification of all asynchronous signals. The kernel then notifies the aslwp of the asynchronous signal at step 310. At step 320, the aslwp redirects the signal to the LWP having a thread with this signal unmasked. At step 330, the signal is delivered to the LWP having a thread with the signal unmasked.

When a signal is sent to a process, the aslwp is notified of the signal. The signal notification completes the signal generation portion of the current signal delivery model, shown as step 200 in FIG. 2. However, no delivery has occurred, as yet. Thus, when the aslwp receives a notification, no side-effects are triggered, no signal information is transferred, nor id signal queuing affected. The aslwp, on receiving the notification, selects a target thread. The aslwp redirects the signal to this target thread, through the target thread's LWP. If a target thread cannot be found, the signal is stored as pending. Later, when a thread unmasks the signal, the signal is redirected to the thread's LWP. This is known as self-redirection because the module receiving the notification redirects the signal to itself. The actual delivery of the signal occurs after this redirection and will do so to the target thread's LWP.

The signal is thus generated and delivered only once. Once-only generation preserves the signal processing semantics. Once-only delivery to a thread that has the signal unmasked also preserves signal masking semantics. As the signal information and queue is preserved in the kernel until the signal is finally delivered, the correct signal information and queuing semantics are preserved. The method of the present invention thus retains all key aspects of the present signal model. Moreover, this method provides benefits to both uniprocessor systems, such as host computer system 10 configured only with central processor 14(1), and multiprocessor systems, such as host computer system 10 configured with central processors 14(1)–14(N).

The method of the present invention may, in the alternative, be viewed as a call from the kernel up to the user-level via the aslwp. In this scenario, the kernel queries the user-level threads library regarding which LWP the signal should be directed to, using the aslwp. The user-level code executed by the aslwp inspects the user threads' masks and selects a target thread. The aslwp then re-directs the signal to the target thread by informing the kernel of the LWP on which the target thread is running. The kernel completes the signal's delivery by performing actual signal delivery to this LWP. In this manner, modules at the user-level work with those at the kernel-level to deliver the signal to the proper user-level thread.

Figure 4:
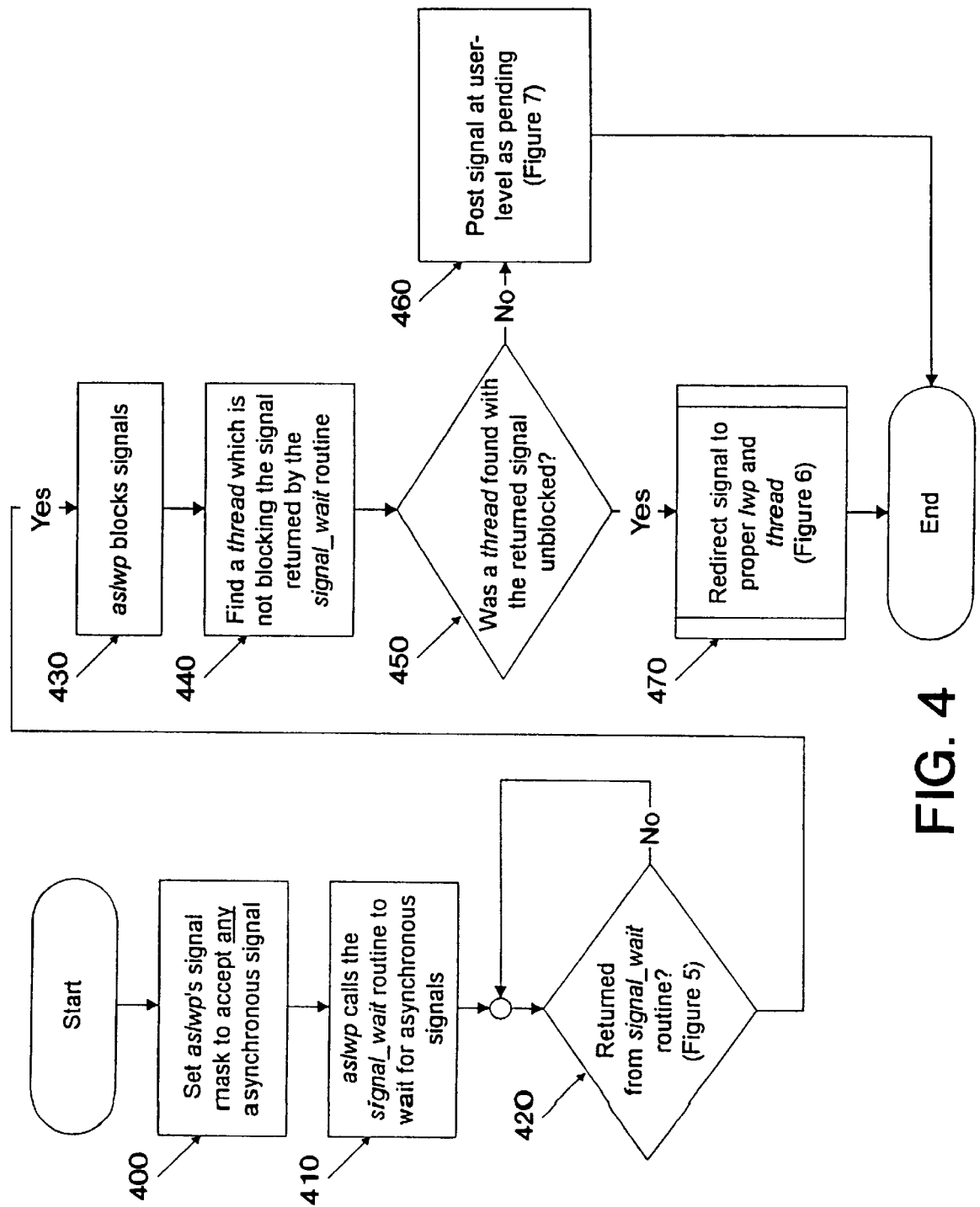
FIG. 4 is a flowchart further describing the steps of FIG. 3.

Details of the method of the present invention are set forth in FIG. 4. At step 400, the aslwp is configured to accept all asynchronous signals. Next, the aslwp calls the signal_wait module which causes the aslwp to wait for asynchronous signals (step 410). At step 420, the aslwp waits for the signal_wait module to return control. Upon returning from the signal_wait module, the aslwp is configured to ignore signals at step 430, thus ensuring that the aslwp is not interrupted by other system events or user actions. At step 440, the aslwp determines which thread or threads are not masking the signal returned by the signal_wait module. At step 450, it is determined whether a thread, having the returned signal unmasked, was found. If no such signal was found, processing continues at step 460, where the signal is posted in a user level global_signal_mask to store the signal as pending. At step 470, if one or more threads were found with the return signal unmasked, the signal is redirected to the proper LWP and thread. This completes the processing of the generated signal.

Figure 5:
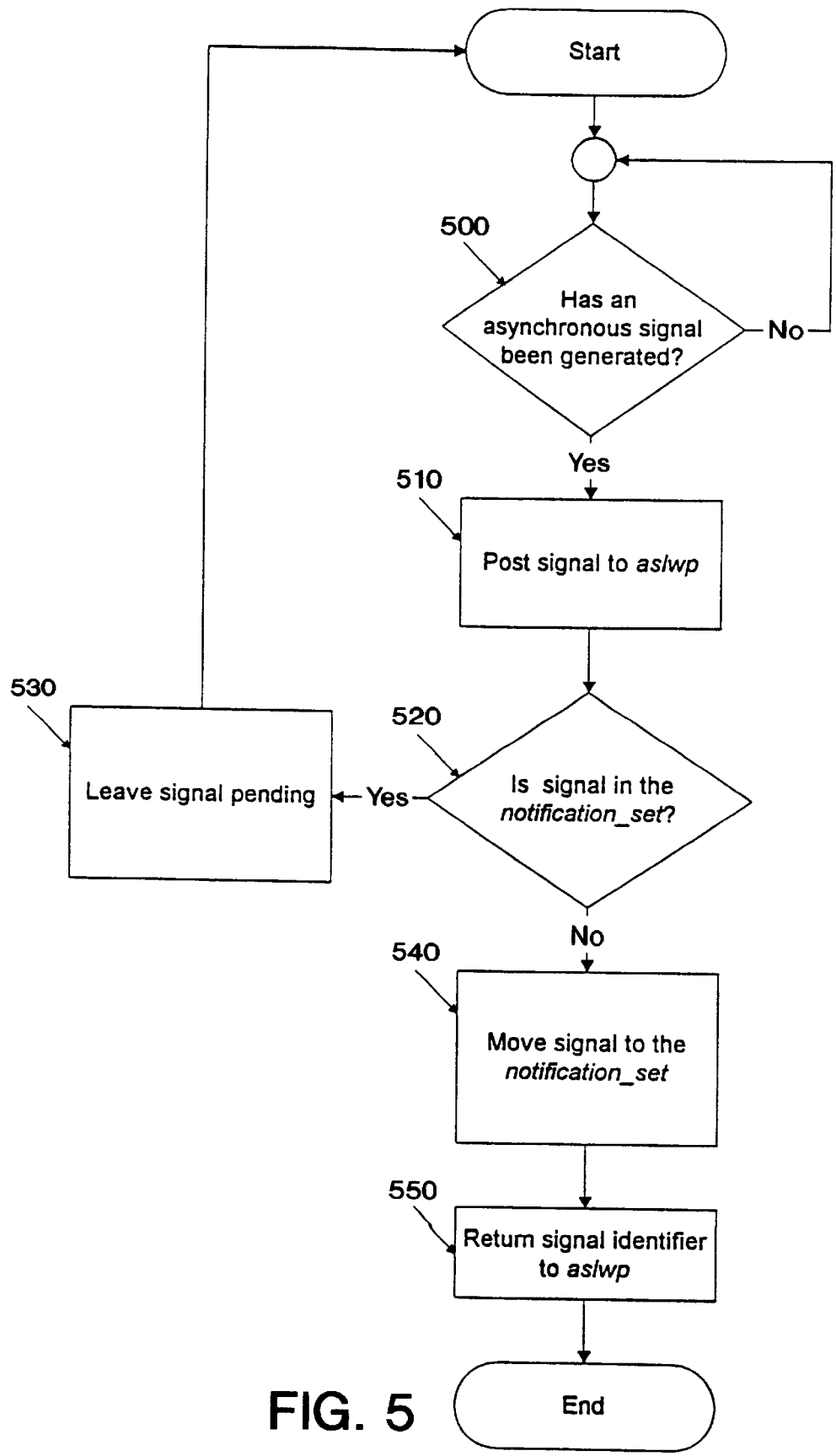
FIG. 5 is a flowchart describing the steps of signal generation and notification of the aslwp by the signal_wait routine according to one embodiment of the present invention.

When the aslwp makes the call to the signal_wait module, control is transferred to the signal_wait module. The steps performed in this module are illustrated in FIG. 5. At step 500, the signal_wait module waits for the generation of an asynchronous signal. If no asynchronous signal is generated, the signal_wait module waits for the generation of a signal. Once the signal is generated, processing continues at step 510, where the signal is posted to the aslwp's kernel_thread_struct. At step 520, the signal_wait module determines whether the signal in question is already posted in the notification_set. If the signal is already posted in the notification_set, the signal is left pending in the aslwp's kernel_thread_struct at step 530. This allows for handling the generation of multiple instances of a signal. A signal notification is simply an indication to the aslwp that a signal, directed at a specified process, has occurred. If the signal is not in the notification_set, processing continues at step 540, where the signal is moved from the aslwp's kernel_thread_struct to the notification_set. The signal's queued information structure remains in the kernel, reflecting the fact that actual signal_delivery has not yet occurred. At step 550, the signal_wait module returns a value to the aslwp identifying the signal which was generated.

Signal redirection is the new stage which completes the first half of the actual signal delivery. Actual signal delivery occurs on the LWP to which the signal is redirected. Two entities can cause signal redirection to occur: the aslwp or a thread. In aslwp redirection (shown in FIG. 6), if the aslwp finds a thread that can take the signal, the aslwp redirects the signal to that thread. In self-redirection (shown in FIG. 7), a thread redirects a signal to itself when the thread unmasks a previously-masked pending signal in the global_signal_mask.

Figure 6:
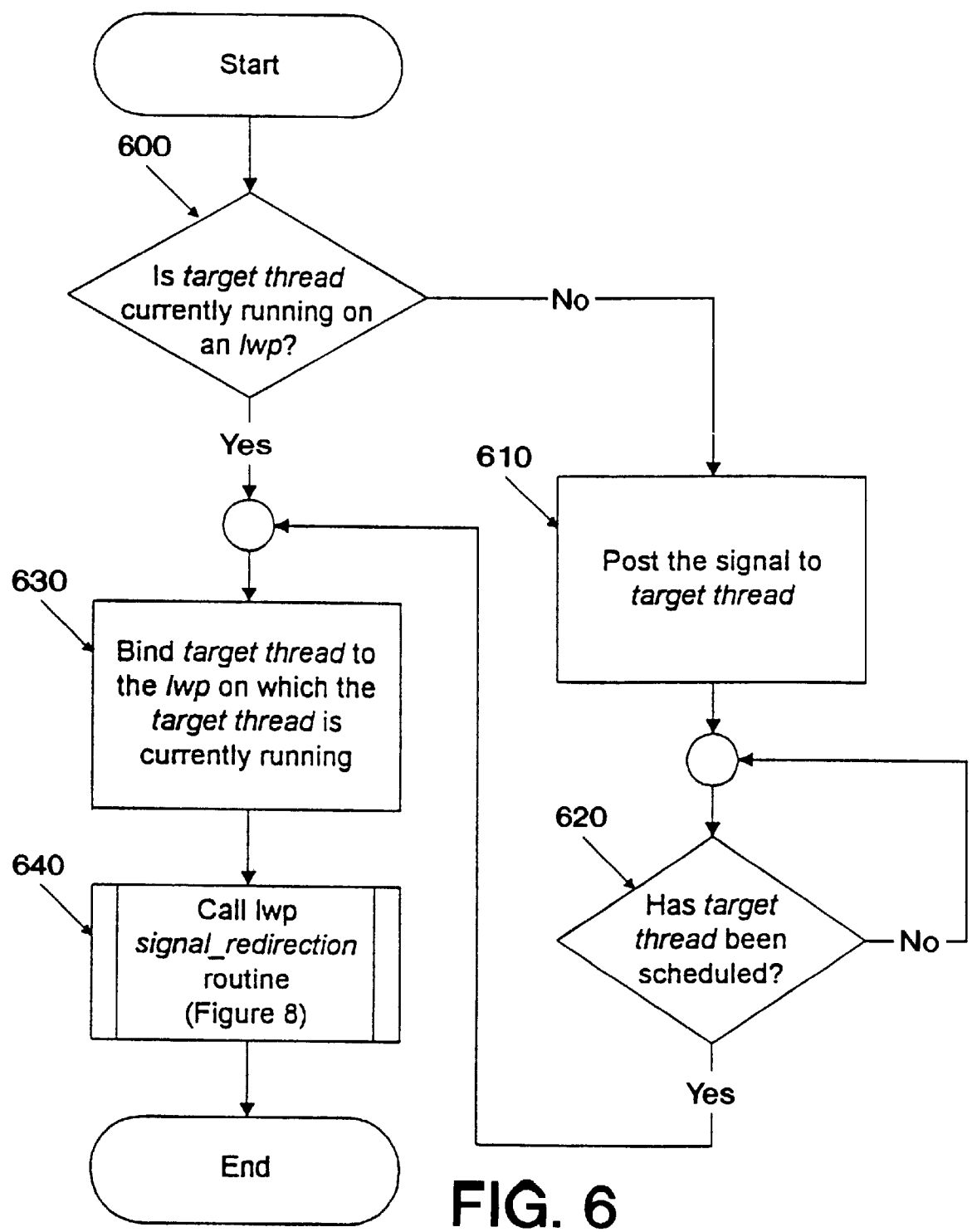
FIG. 6 is a flowchart describing the steps of signal redirection according to one embodiment of the present invention.

Redirection by the aslwp (step 470 in FIG. 4) is further explained and illustrated by FIG. 6. At step 600, it is determined whether the target thread is currently running on an LWP. If the target thread is not currently running on an LWP, the signal is posted to the target thread's mask of pending redirected signals at step 610. At step 620, the system waits for the target thread to be scheduled to run. Processing then continues at step 630. However, if the target thread is currently running on an LWP, the target thread is bound to the LWP on which the target thread is currently running at step 630. The signal_redirection module is then called at step 640.

Figure 7:
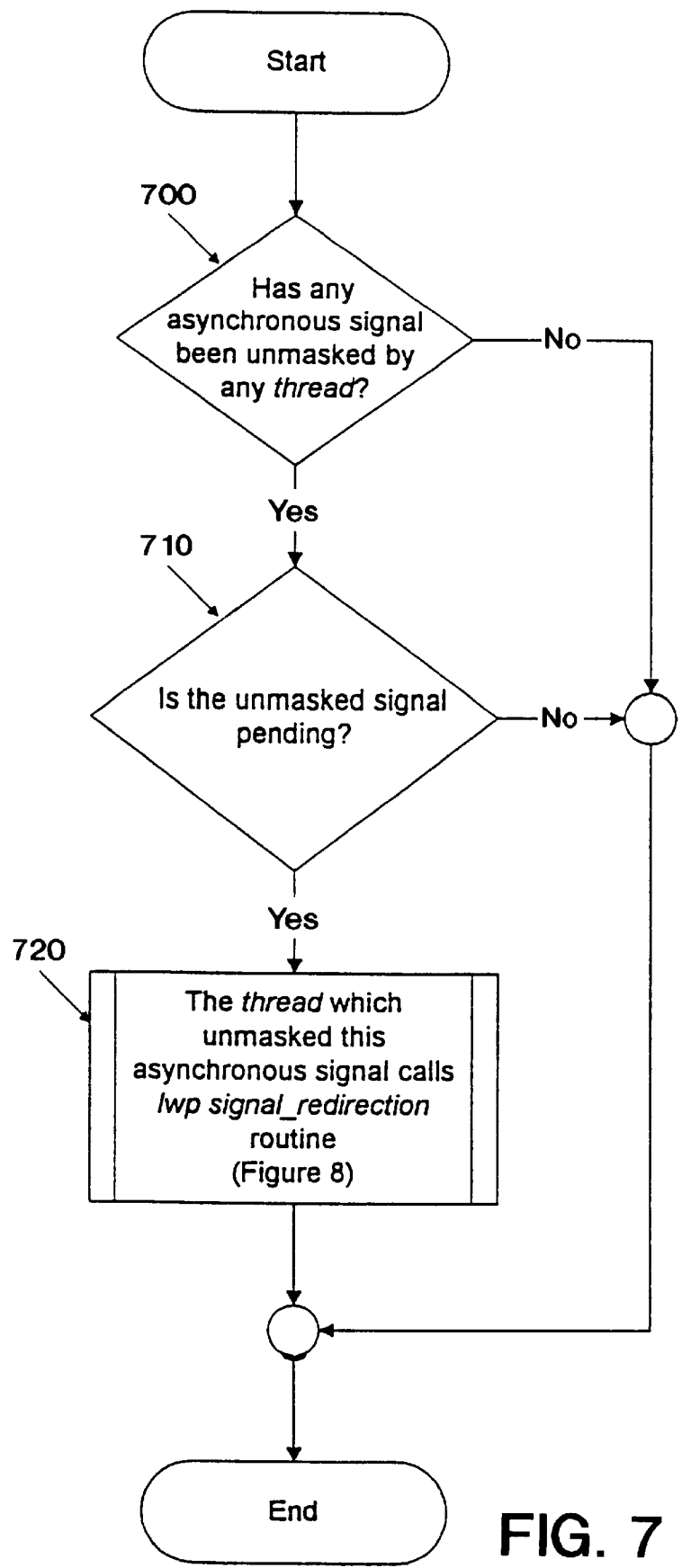
FIG. 7 is a flowchart describing the steps of the redirection of a posted signal according to one embodiment of the present invention.

If all threads are masking the signal at initial signal notification time, the aslwp posts the signal in the user-level global_signal_mask (step 460 in FIG. 4). When a thread unmasks a signal that is in the global_signal_mask, the thread redirects the signal to itself by calling the signal_redirection module. This is known as self-redirection and redirects the signal from the aslwp to the target thread's current LWP. The processing of this signal is illustrated in FIG. 7. At step 700, it is determined if any asynchronous signal has been unmasked by any thread. If no thread has unmasked an asynchronous signal, no further action is required. However, if one or more threads have unmasked one or more asynchronous signals, the system determines whether the signal that was unmasked is pending in the user level global_signal_mask at step 710. If the unmasked signal is not pending in that mask, no further action is required by the target thread. However, if the signal is pending, processing continues to step 720, where the thread which unmasked this asynchronous signal calls the signal_redirection module.

A problem faced by such systems is an edge condition causing the loss of one or more signals. When a thread is about to mask a signal that has already been sent via the signal_redirection module to its LWP, this is detected and the signal_redirection module is immediately called. This ensures that an edge condition does not result in the loss of signals.

Figure 8:
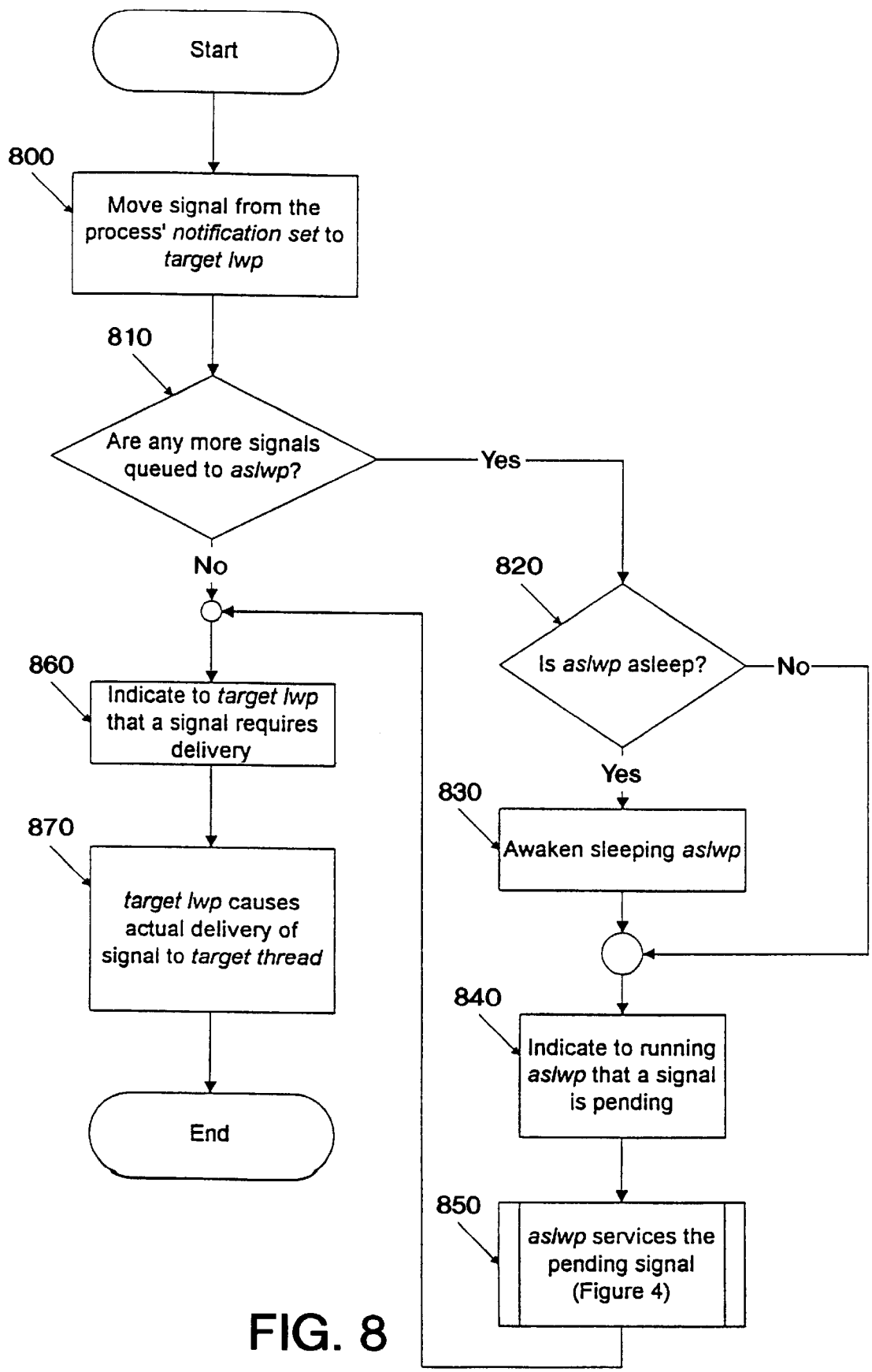
FIG. 8 is a flowchart describing the steps of signal delivery according to one embodiment of the present invention.

The call to the signal_redirection module shown in FIGS. 6 and 7 is further illustrated in FIG. 8. At step 800, the signal is moved from the notification_set to the target LWP's signal_info_struct. At step 810, it is determined whether any more signals are queued to the aslwp. If more signals are queued to the aslwp, the process continues to step 820 where it is determined whether aslwp is asleep. If asleep, the aslwp is awakened at step 830. The (now) running aslwp is then notified that a signal is pending at step 840. At step 850, the aslwp services the pending signal by performing the processes indicated in FIGS. 2–8 and described above.

In this manner, the method of the present invention implements signal queuing. As mentioned, asynchronous signals previously sent to the designated LWP are now sent to the aslwp. Queuing is realized in a two-part process: multiple occurrences of the same signal are received and queued by the aslwp. Initially, the aslwp processes the first signal in the queue. All other signal instances remain queued. These queued signals may result in awakening the aslwp, but the aslwp will return to the sleeping state until the signal is delivered from the notification_set via the eventual call to the signal_redirection module. When the signal is eventually delivered, and thus deleted from the notification set, the aslwp again checks for signals using the signal_redirection module. Now, because the previous signal is no longer pending in the notification_set, the aslwp promotes the pending signal into the notification_set and returns to the user-level, treating this as a new notification. The actions entailed in signal notification then occur. Thus, one after another, the queued signals undergo notification and delivery.

At step 860, the target LWP is notified that a signal requires delivery. The target LWP causes the actual delivery of the signal to the target thread at step 870. This delivery step is the same as the delivery step in the normal generation/delivery paradigm illustrated in FIG. 2.

The architecture of the present invention properly implements the signal generation/delivery mechanism in a multithreaded environment. The system also provides faster signal masking, due to the fact that such masking occurs at the user level. The architecture of the present invention thus enables fast or optimistic signal masking. Optimistic signal masking is important for building fast critical code sections which are safe from interruption by asynchronous signals. The "optimism" implemented is that signals do not occur and so the process masking these signals need not inform the signal delivery mechanism (i.e., the kernel) of the mask, reducing the computational load on the kernel. Processing a signal is expensive when one does occur, but this is expected to be a relatively rare event. The method of the present invention also benefits at least certain systems supporting only single-thread processes because the method allows the use of optimistic signal masking.

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software modules executing in a computer system. The modules may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. For example, although the described embodiments refer to operation in the context of a UNIX system, the present invention will also find application in various other operating systems. The specification and drawings are, accordingly, to be regarded in an illustrative rather than a restrictive sense, the invention being limited only by the provided claims and their full scope of equivalents.

What is claimed is:

1. A computer-implemented method for delivering an asynchronous signal comprising:
   configuring a first process to accept any one of a plurality of asynchronous signals, wherein said first process is visible in a kernel space and in a first user space;
   calling a second process, said second process returning to said first process a value identifying said asynchronous signal; and
   determining whether at least one of a plurality of processes will accept said asynchronous signal, wherein said plurality of processes are visible in at least one user space and are not visible in said kernel space, and
      if at least one of said plurality of processes will accept said asynchronous signal,
         selecting a selected process from said at least one of said plurality of processes,
         redirecting said asynchronous signal to said selected process and
         delivering said asynchronous signal to said selected process,
      else storing said asynchronous signal.

2. The method of claim 1, wherein said first process comprises a first lightweight process, said first lightweight process configured to accept all of said plurality of asynchronous signals.

3. The method of claim 2, wherein said selecting is performed at least partially by said first lightweight process.

4. The method of claim 1, wherein said selected process is a first thread, said first thread being a sequence of instructions within an application.

5. The method of claim 1, wherein said second process performs actions comprising:
   waiting for generation of said asynchronous signal to occur; and
   determining whether a prior asynchronous signal of the same type as said asynchronous signal is awaiting delivery to said selected process, and
      if said prior asynchronous signal is awaiting delivery to said selected process
         leaving said asynchronous signal pending and
         restarting said second process without returning to said first process,
      else
         returning said value to said first process.

6. The method of claim 1, wherein said redirecting comprises:
   binding said selected process to a related process on which said selected process is currently running;
   servicing each one of a plurality of asynchronous signals awaiting processing by said first process;
   repeating said servicing until no asynchronous signals are awaiting processing by said first process; and
   indicating to said related process that said asynchronous signal requires delivery.

7. The method of claim 1, wherein said second process performs actions comprising:
   waiting for generation of said asynchronous signal to occur; and
   determining whether a prior asynchronous signal of the same type as said asynchronous signal is awaiting delivery to said selected process, and
      if said prior asynchronous signal is awaiting delivery to said selected process
         restarting said second process without returning to said first process,
      else
         returning said value to said first process.

8. The method of claim 7, wherein said redirecting comprises:
   determining whether said selected process is currently running, and if said selected process is not currently running,
      waiting for execution of said selected process to restart;
   binding said selected process to a related process on which said selected process is currently running; and
   calling a third process.

9. The method of claim 8, wherein said related process comprises a second lightweight process.

10. The method of claim 8, wherein said third process performs actions comprising:
    servicing each one of a plurality of asynchronous signals awaiting processing by said first process;
    repeating said servicing until no asynchronous signals are awaiting processing by said first process; and
    indicating to said related process that said asynchronous signal requires delivery.

11. The method of claim 10, wherein said servicing comprises:
    determining whether any of said plurality of asynchronous signals are awaiting processing by said first process; and upon determining that at least one of said plurality of asynchronous signals are awaiting processing by said first process,
  determining whether said first process is asleep, and if said first process is asleep, awakening said first process,
  performing said method for delivering an asynchronous signal using said at least one of said plurality of asynchronous signals awaiting processing by said first process.

12. The method of claim 1, further comprising:
  determining whether one of said plurality of processes will accept one of said plurality of asynchronous signals which said one of said plurality of processes did not previously accept;
  upon determining that said one of said plurality of processes will accept said one of said plurality of asynchronous signals, determining whether said information relating to said one of said plurality of asynchronous signals was stored; and
  upon determining that said information relating to said one of said plurality of asynchronous signals was stored, calling a third process.

13. The method of claim 12, wherein said third process performs actions comprising:
  servicing each one of a plurality of asynchronous signals awaiting processing by said first process;
  repeating said servicing until no asynchronous signals are awaiting processing by said first process; and
  indicating to said related process that said asynchronous signal requires delivery.

14. The method of claim 13, wherein said servicing comprises:
  determining whether any of said plurality of asynchronous signals are awaiting processing by said first process; and
  upon determining that at least one of said plurality of asynchronous signals are awaiting processing by said first process,
    determining whether said first process is asleep, and if said first process is asleep, awakening said first process,
    performing said method for delivering an asynchronous signal using said at least one of said plurality of asynchronous signals awaiting processing by said first process.

15. A computer-implemented method for delivering an asynchronous signal comprising:
  determining if generation of an asynchronous signal has occurred;
  notifying a first process of said generation of said asynchronous signal, wherein said first process is visible in a kernel space and in a first user space;
  redirecting said asynchronous signal to a second process capable of receiving said asynchronous signal, wherein said second process is visible in a second user space and is not visible in said kernel space; and
  delivering said asynchronous signal to said second process.

16. The method of claim 15, wherein said redirecting comprises:
  selecting said second process from a plurality of processes; and
  indicating said asynchronous signal is to be delivered to said second process.

17. The method of claim 15, wherein said computer-implemented method is implemented on a computer comprising a single central processing unit.

18. The method of claim 15, wherein said computer-implemented method is implemented on a computer comprising a plurality of central processing units.

19. A computer-implemented method for delivering an asynchronous signal, comprising:
  receiving notification of an asynchronous signal, said notification of said asynchronous signal being received by a first process, wherein said first process is visible in a kernel space and in a first user space; and
  redirecting said asynchronous signal to a second process, wherein said second process is visible in a second user space and is not visible in said kernel space.

20. A computer system comprising:
  a processing system that is configured to deliver an asynchronous signal to a first process by virtue of executing a second process configured to:
    receive notification of an asynchronous signal, said notification of said asynchronous signal being received by said second process, wherein said second process is visible in a kernel space and in a first user space; and
    redirect said asynchronous signal to said first process, wherein said first process is visible in a second user space and is not visible in said kernel space.

21. A computer system comprising:
  a processing system that is configured to deliver an asynchronous signal by virtue of being configured to:
    determine if generation of an asynchronous signal has occurred;
    notify a first process of said generation of said asynchronous signal, wherein said first process is visible in a kernel space and in a first user space;
    redirect said asynchronous signal to a second process capable of receiving said asynchronous signal, wherein said second process is visible in a second user space and is not visible in said kernel space; and
    deliver said asynchronous signal to said second process.

22. The computer system of claim 21, wherein said processing system determines if an asynchronous signal has been generated by:
  waiting for generation of said asynchronous signal to occur; and
  determining whether a prior asynchronous signal of the same type as said asynchronous signal is awaiting delivery to said selected process, and
  if said prior asynchronous signal is awaiting delivery to said selected process,
    leaving said asynchronous signal pending and
    restarting said second process without returning to said first process,
  else
    returning said value to said first process.

23. The computer system of claim 22, wherein said processing system redirects and delivers said asynchronous signal by:
  binding said selected process to a related process on which said selected process is currently running;
  servicing each one of a plurality of asynchronous signals awaiting processing by said first process;
  indicating to said related process that said asynchronous signal requires delivery; and
  delivering said asynchronous signal to said selected process.

24. The method of claim 21, wherein said computer-implemented method is implemented on a computer comprising a single central processing unit.

25. The method of claim 21, wherein said computer-implemented method is implemented on a computer comprising a plurality of central processing units.

26. A computer program product for delivering an asynchronous signal, said product comprising:
   code that determines if generation of an asynchronous signal has occurred;
   code that notifies a first process of said generation of said asynchronous signal, wherein said first process is visible in a kernel space and in a first user space;
   code that redirects said asynchronous signal to a second process capable of receiving said asynchronous signal, wherein said second process is visible in a second user space and is not visible in said kernel space;
   code that delivers said asynchronous signal to said second process; and
   a computer-readable medium that stores the codes.

27. The computer program product of claim 26, wherein said code that notifies a first process of said generation of said asynchronous signal further comprises:
   code that waits for said generation of said asynchronous signal to occur; and
   code that determines whether a prior asynchronous signal of the same type as said asynchronous signal is awaiting delivery to said selected process, and
   if said prior asynchronous signal is awaiting delivery to said selected process
      leaves said asynchronous signal pending and
      restarts said second process without returning to said first process,
   else
      returns said value to said first process.

28. The computer program product of claim 26, wherein said code that redirects said asynchronous signal further comprises:
   code that binds said selected process to a related process on which said selected process is currently running;
   code that services each one of a plurality of asynchronous signals awaiting processing by said first process; and
   code that indicates to said related process that said asynchronous signal requires delivery.

29. A computer program product for delivering an asynchronous signal, said product comprising:
   code that receives notification of an asynchronous signal, said notification of said asynchronous signal being received by a first process, wherein said first process is visible in a kernel space and in a first user space; and
   code that redirects said asynchronous signal to a second process, wherein said second process is visible in a second user space and is not visible in said kernel space; and
   a computer-readable medium that stores the codes.

30. A computer system comprising:
   a first electronic storage system having access to at least one executable program;
   a processing system that is configured to execute said at least one executable program and to generate and deliver at least one asynchronous signal to said at least one executable program, by virtue of being configured to:
      determine if generation of an asynchronous signal has occurred;
      notify a first process of said generation of said asynchronous signal, wherein said first process is visible in a kernel space and in a first user space;
      redirect said asynchronous signal to a second process capable of receiving said asynchronous signal, wherein said second process is visible in a second user space and is not visible in said kernel space; and
      deliver said asynchronous signal to said second process.

31. The computer system of claim 30, wherein said processing system is configured to notify said first process of the generation of said asynchronous signal by virtue of being further configured to:
   wait for the generation of said asynchronous signal; and
   determine whether a prior asynchronous signal of the same type as said asynchronous signal is awaiting delivery to said selected process, and
   if said prior asynchronous signal is awaiting delivery to said selected process
      leave said asynchronous signal pending and
      restart said second process without returning to said first process,
   else
      return said value to said first process.

32. The computer system of claim 31, wherein said processing system is configured to redirect and deliver said asynchronous signal by virtue of being further configured to:
   bind said selected process to a related process on which said selected process is currently running;
   service each one of a plurality of asynchronous signals awaiting processing by said first process;
   indicate to said related process that said asynchronous signal requires delivery; and
   deliver said asynchronous signal to said selected process.

33. The method of claim 1, wherein said at least one user space comprises said first user space.

34. The method of claim 15, wherein said second user space is said first user space.

35. The method of claim 19, wherein said second user space is said first user space.

36. The method of claim 20, wherein said second user space is said first user space.

37. The method of claim 21, wherein said second user space is said first user space.

38. The method of claim 26, wherein said second user space is said first user space.

39. The method of claim 29, wherein said second user space is said first user space.

40. The method of claim 30, wherein said second user space is said first user space.

* * * * *